Oct. 4, 1949.                C. S. FRANCIS, JR                2,483,404
                     PROCESS OF MAKING A FIBROUS PRODUCT
                              Filed Aug. 1, 1941

INVENTOR.
CARLETON S. FRANCES, JR
BY Worth Wade
ATTORNEY

Patented Oct. 4, 1949

2,483,404

UNITED STATES PATENT OFFICE 2,483,404

PROCESS OF MAKING A FIBROUS PRODUCT

Carleton S. Francis, Jr., Chestnut Hill, Pa., assignor, by mesne assignments, to American Viscose Corporation, Wilmington, Del., a corporation of Delaware Application August 1, 1941, Serial No. 405,102

5 Claims. (Cl. 154—90)

The present invention relates, in general, to a process of making an interfelted web comprising at least a major portion of potentially adhesive fibres, which web is available for a wide variety of uses in the industry, particularly for use in the production of laminated products. The present application is a continuation-in-part of my co-pending applications Serial No. 300,876, filed October 23, 1939, now U. S. Patent No. 2,459,803, and Serial No. 381,292, filed March 1, 1941, now U. S. Patent No. 2,357,392.

Prior attempts to produce extremely thin fibrous webs, such as tissue paper, and extremely thin and porous felts have been attendant with many difficulties because the thinner the web and the fewer the number of fibres, the less the tensile strength and resistance to tearing and abrasion. It has also not been possible heretofore to produce such thin tissue paper or felts from fibres which did not exhibit an inherent felting characteristic as is exhibited by wool and to a lesser degree by cotton, but is not exhibited at all by smooth-surfaced, relatively straight fibres, such as viscose and acetate rayon and fibres of casein, synthetic resins and the like. In addition, prior to the present invention there has not been available a thin porous web of fibrous material which is capable of being rendered adhesive, and, therefore, available for use in the production of laminated products.

Therefore, it is a general object of the present invention to provide a process of making, in a simple and economical manner, a product comprising a web of interfelted fibres which may be rendered adhesive to bind some of the fibres together, and, if desired, to bind said web to another material or materials.

According to the present invention, the fibrous product is made by interfelting potentially adhesive fibres in the absence of non-adhesive fibres, or in the presence of only a minor proportion of non-adhesive fibres, that is, not more than 50% thereof, and generally not more than 25%. When the fibrous structure is to be employed in the production of a laminated product, the amount of non-adhesive fibres present will not be sufficient to preclude a good bonding surface. The web may be produced by any of a variety of methods which will result in an interfelting of the fibres of the product, as will hereinafter appear. The potentially adhesive fibres may be formed by dispersing a potentially adhesive fibre-forming material into a gas as described in my co-pending application Serial No. 381,292.

In the following specification and in the claims, the term "fibre" or "fibres" when used in reference to the potentially adhesive material is intended to include any fibril, fibre, filament or filamentary structure, regardless of length or diameter, and whether independent from one another or adhered together at spaced points to form a web of reticulated structure. The expression "fibrous structure" includes webs, mats, bats, and other interfelted products. The term "adhesive" includes sticky, cementitious, agglutinous or tacky conditions. The term "non-adhesive fibres" includes those fibres which, although they may be rendered adhesive by some treatment, are not rendered adhesive under the conditions used to activate the potentially adhesive fibres associated therewith.

Among the non-adhesive fibres which may be employed are natural fibres, such for example as wood fibres, cotton, flax, jute, kapok, wool, hair and silk; and synthetic fibres, such for example as cellulosic fibres, such as cellulose hydrate, cellulose derivatives, as cellulose esters, mixed cellulose esters, cellulose ethers, mixed cellulose ester-ethers, mixed cellulose ethers, cellulose hydroxy-alkyl ethers, cellulose carboxy-alkyl ethers, cellulose ether-xanthates, cellulose xantho-fatty acids, cellulose thiourethanes, natural and synthetic rubber and derivatives thereof; fibres made of alginic acid, gelatine, casein; and mineral fibres such, for example, as spun glass, asbestos, mineral wool and the like; and fibres made of natural and synthetic resins which are not rendered tacky when the potentially adhesive resin fibres are rendered tacky; also fibres and filaments made by slitting, cutting or shredding non-fibrous films, such as waste cellophane.

The interfelted web of the present invention may be activated to bind at least some of the potentially adhesive fibres together to form a sheet of relatively high tensile strength and resistance to tearing and abrasion. The activation may provide a porous product, or, if the activation is carried further, an impermeable product is obtained. Among the uses of the porous products, its use as a battery separator and as a filtering medium may be mentioned. Waterproof articles, such as raincoats, may be fabricated from the impermeable product, which, due to the presence of the fibres, has superior tensile strength and tear resistance.

In the event the product is capable of further activation, the porous or impermeable sheet described may be used in the production of laminated products. In the laminating art, the interfelted web of the potentially adhesive fibres, before or after activation, preferably the former, is disposed between a layer of a textile fabric, felt, paper, wood, film, glass and the like, and a layer of the same or of different material, and the composite product subjected to sufficient solvent or heat and pressure to activate the potentially adhesive fibres and unite the layers to each other. In the sealing art, the layer of potentially adhesive fibres is inserted between the overlapping or contiguous surfaces of a wrapper or carton or between the folds or overlapping area of a fabric, and the same closed and sealed by the application of heat and pressure, or by the application of pressure and a solvent of the fibres with or without the use of heat. Instead of placing the interfelted web between two layers, as above described, the interfelted web may be superimposed on the surface of any material which it is desired to coat. The product is then treated to activate the potentially adhesive fibres to cause the web to adhere to the material with which it is in contact. In this instance it may be desirable to activate the web to a sufficient degree to cause the potentially adhesive fibres to flow to form a continuous film. While the fibres are still adhesive, pressure may be applied to insure the production of a smooth, glossy surface. The products formed by all of the procedures described in this paragraph, as well as by analogous procedures, are termed herein "laminated materials."

The invention, accordingly, comprises the several steps and relation of one or more of such steps with respect to each of the others, and the product possessing the features, properties, and the relation of elements, which are exemplified in the following detailed disclosure, and the scope of the invention will be indicated in the claims.

For a more complete understanding of the invention, reference should be had to the accompanying drawing, in which.

Figure 1:
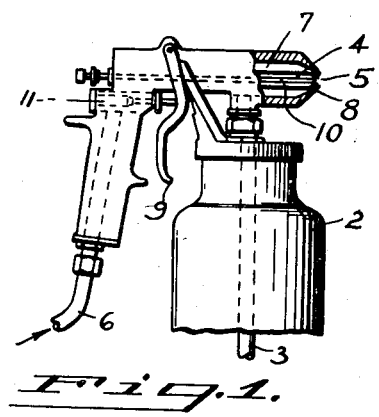
Fig. 1 is a side elevation, partly in section, of one embodiment of suitable means for forming the potentially adhesive fibres of the invention.

The potentially adhesive fibres may be a cellulose derivative, a resin or rubber. Among the cellulose derivatives which are suitable are, for example, cellulose esters, cellulose ethers, mixed cellulose ester-ethers, mixed cellulose esters, mixed cellulose ethers, and mixtures of cellulose derivatives. Among the resins which may be employed for forming the potentially adhesive fibres are, for example, cheap natural resins, such as shellac, dammar, copal, and the like, and synthetic resins formed by the polymerization of various organic compounds, such as coumarone, indene hydrocarbons, vinyl, styrene, sterols, aldehydes, furfural, ketones, urea thiourea phenol-aldehyde resins, either alone or modified with oils, urea-aldehyde resins, sulfonamide-aldehyde resins, polyhydric alcohol-polybasic acid resins, drying oil-modified alkyd resins, resins formed by acrylic acid, its homologues and their derivatives, sulfur-olefine resins, resins formed from dicarboxylic acids and diamines (nylon type); synthetic rubber and rubber substitutes, herein called "resins," such for example as polymerized butadiene, olefine polysulfides, iso-butylene polymers, chloroprene polymers; and fibres formed from a resin comprising the product of co-polymerizing two or more resins, such, for example, as co-polymers of vinyl halide and vinyl acetate, co-polymers of vinyl halide and an acrylic acid derivative, co-polymers of vinyl compound and styrol compound; and also a mixture of resins, such for example as a mixture of vinyl resins and acrylic acid resins or methacrylic acid resins, a mixture of polyolefine resins and phenol-aldehyde resins, or a mixture of two or more resins from the different classes just named. There may be employed also fibres made from rubber latex, crepe rubber, gutta percha, balata, and the like.

Further, the potentially adhesive fibres may be mixtures of the cellulose derivatives with resins or rubber, such for example, as a mixture of cellulose nitrate and an acrylic acid resin, or a mixture of benzyl cellulose and a vinyl resin, or a mixture of ethyl cellulose and shellac.

As previously stated, the potentially adhesive fibres may be made by dispersing into a gas, a potentially adhesive fibre-forming material. By this procedure, such materials as are not adapted to the forming of fibres by extrusion may be utilized, since such factors as filtering characteristics, solution viscosity and fibre tenacity are not critical in that process.

In order to disperse the fibre-forming material into the gas, the material is rendered flowable, i. e., plastic or molten or dissolved in a solvent. In making up the fibre-forming solution, the fibre-forming material may be dissolved in a suitable organic solvent which will volatilize rapidly at moderately elevated temperatures. Suitable solvent mixtures may be selected by those skilled in the art having regard for the nature of the fibre-forming substance.

As an alternative to dissolving the substance in a suitable solvent, the fibre-forming material may be heated until plastic or molten and the plastic or molten mass dispersed into fibres as hereinafter described.

The proportion of the fibre-forming substance to the solvent will depend, inter alia, upon the nature of the fibre-forming material, the type of dispersing device employed, and the type of fibres desired to be produced. In general, solution concentrations of from 5% to 50% will be suitable for most fibre-forming substances and conditions.

To the fibre-forming material or solution thereof, there may be added suitable plasticizers, hardening agents for the resins, latent activating agents, dyes, pigments, moth-proofing agents, fireproofing agents, waterproofing agents, and the like. In particular, it may be desirable to add to the material or solution suitable substances for lowering the thermal softening point of the fibres produced, such, for example, as plasticizers, soft resins, and the like. Among suitable plasticizers for this purpose are dibutyl tartrate, ethyl phthallyl ethyl glycolate, while suitable soft resins are polyvinyl acetate, ester gum, coumarone resins and the lower polymer of alkyd resins.

Generally speaking, the fibre-forming process comprises dispersing the fibre-forming material while in flowable condition, that is, in solution or plastic or molten condition, into a gaseous atmosphere under sufficient pressure to form a multiplicity of fibres. When a solution is employed, the dispersion is preferably into a gaseous atmosphere which is heated sufficiently to evaporate the solvent rapidly. In this embodiment, the organic solvent may be wasted or recovered in a suitable manner as by scrubbing or absorption. When a molten mass is dispersed, the atmosphere is preferably cooled so as to cause a rapid congealing or solidification of the fibre-forming material.

To carry out the fibre-forming process, there may be used any suitable means for converting the flowable substance or composition into fibrous form and the invention is not to be limited to the particular means hereinafter described.

In one embodiment of the invention, the fibre-forming composition is dispersed into a heated gaseous atmosphere by means of a spray gun or atomizer comprising, in combination, means to supply the fluid composition under pressure to an orifice, means to supply one or more streams of air or gas at a point adjacent the fluid orifice so as to disperse and disrupt the stream of fluid issuing from the orifice.

There is shown in Fig. 1 a conventional type of spray gun, hereinafter designated generally by the reference character 1, and comprising essentially a container 2 adapted to hold the fibre-forming composition from which it is forced by air pressure through the supply line 3 to the chamber 4 from which the composition is discharged through the orifice 5. The air is supplied through the line 6 to the air chamber 7 which surrounds the chamber 5 and terminates in a plurality of orifices 8 positioned adjacent the orifice 5. The trigger or handle 9 is adapted to operate the pin valve 10 which opens the orifice 5 and the air valve 11 which opens the air line 6. As the stream of fibre-forming composition is discharged from the orifice 5, it is disrupted by the force of the tangential streams of air discharged through the orifices 8. The size, shape and character of fibre produced by this spraying operation is a function, inter alia, of the viscosity of the solution, the pressure under which the solution and air are discharged, the angle with which the air streams contact the fluid stream, but these factors and their control are well known to those skilled in the art and can be adjusted to produce various types of fibres without transcending the scope of the invention. When the fibre-forming material is plastic or molten, the material suitably heated to render it flowable is caused to flow into contact with an air stream which disperses the material into fibres, or is forced under pressure through an orifice into fibres and means may be provided to maintain the material flowable to the point of dispersion.

In another embodiment, the potentially adhesive fibres may be formed by electrical dispersion in a gaseous atmosphere. For example, a stream of the fibre-forming material is caused to flow into an electrically charged field, whereupon the stream is dispersed into a multiplicity of fibres which are attracted in the direction of an oppositely charged element, and the fibres so produced may be collected on a belt such as the belt 24 of Fig. 2.

The fibres produced may be independent and separable from one another or they may adhere to each other at spaced points to form a more or less fibre web or reticulated structure, depending upon whether the fibre is inherently tacky or is still tacky due to its temperature or to the presence of residual solvent when the fibres contact each other in settling-out together from the gaseous dispersion.

It is to be understood that when the formation of the above-described fibres takes place in the presence of non-adhesive textile or felt fibres that the potentially adhesive fibres may adhere to such other fibres, as well as to themselves if the solvent is not completely removed from the fibre at the points of mixing and depositing. Accordingly, it is possible in the present invention to form, mix and substantially adhere or combine the fibres together in immediate sequence, that is, concurrently and continuously, merely by regulating the rate of evaporation of the organic solvent and the time elapsing between the formation of the potentially adhesive fibres and the point of contact with the other fibres.

If desired, the formation of the potentially adhesive fibres may be carried out in a chamber separate from but connected with the chamber in which these fibres are allowed to deposit in the form of a bat or web. Thus, a single fibre-forming means may serve to supply fibres for a plurality of different depositing chambers.

The above-described fibre-forming processes may be employed for producing the non-adhesive textile or felt fibres as well as the potentially adhesive fibres.

Figure 2:
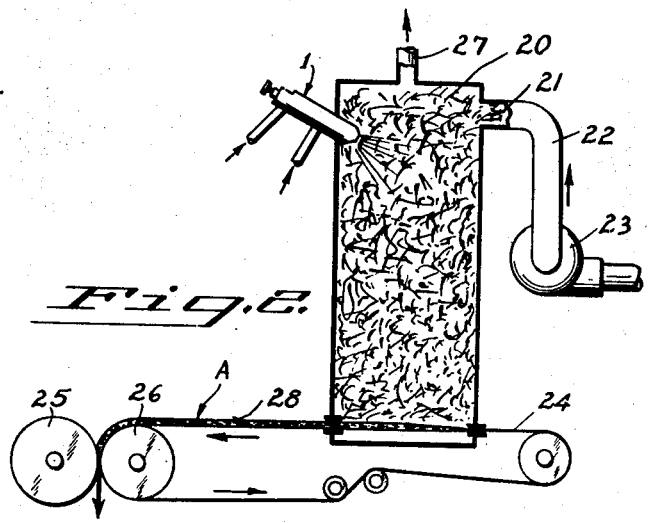
Fig. 2 is a side elevation, party in section, of one embodiment of means for carrying out the invention in the fabrication of felts and papers.

In Fig. 2, there is shown one embodiment of suitable apparatus for forming the fibre mat of the invention. A composition suitable for forming potentially adhesive fibres is dispersed by means of the spray gun 1 into a heated gaseous atmosphere contained in the chamber 20 into which may be simultaneously blown non-adhesive fibres 21 through conduit 22 by means of a blower 23. The fibres fall downwardly in the chamber and come to rest on the surface of an endless belt 24 made of porous or perforated flexible material such as textile, metal, leather or the like, which is positioned in a horizontal plane at the base of the chamber 20. The mat of fibres 28 is carried on the belt from the chamber and through pinch rolls 25 and 26 which compress the bat and enable it to be removed from the belt for activating or finishing operations to be hereinafter described. If the potentially adhesive fibres produced by spraying are thermoplastic, the rolls 25 and 26 may be heated sufficiently to activate the thermoplastic fibres, the fibres becoming deactivated when the mat 28 passes from the rolls and becomes cool. The solvent evaporated from the fibre-forming composition may be withdrawn from the chamber 20 through exhaust pipe 27 and wasted or recovered in a known manner. A suction pump (not shown) is connected to the apparatus below chamber 20 to create a downward draft through endless belt 24 as it passes under chamber 20. When using potentially adhesive fibres which are activatable by means of an organic solvent, such solvent can be sprayed on the fibre bat as it is carried on the belt, as at point A, so that the fibres are in an adhesive condition when passing through the pressure rolls 25 and 26. In the manufacture of paper tissues, the belt 24 may be considered as comprising the wire screen of the paper-making machine. Thus, the fibre-forming and felting steps in making the felts and papers are carried out concurrently and continuously, that is, in immediate sequence in a simple and economical manner. In making an interfelted web containing only potentially adhesive fibres in an apparatus such as shown in Figure 2, the conduit 22 and the blower 23 are omitted. If a felt of greater thickness than can be obtained with a single deposition of fibres is desired, the bat may be built up to the desired thickness by repeated passages thereof under chamber 20.

When it is desirable to utilize non-thermoplastic fibres in conjunction with fibres obtained by dispersion into a gas of a potentially adhesive fibre-forming material, this may be accomplished by forming a carded web of the non-thermoplastic fibres, and during the formation of the bat, the potentially adhesive fibres may be formed as previously described and commingled with the other fibres as the layers of the web are built up on the endless belt.

In order to facilitate handling the bat of fibres without damaging it, the potentially adhesive fibres are rendered adhesive by heat or solvent to cause at least a partial adhesion between the fibres. The activation of the adhesive fibres may be effected later as in the step of laminating, sealing, molding and the like, as herein described. Among the methods which may be used for activation are the following, taken singly or together in appropriate combinations.

1. When the potentially adhesive fibres are thermoplastic, they may be activated by heat, with or without pressure.

2. By applying to the fibrous mixture a solvent or swelling agent, or mixtures thereof with diluents, under such conditions of concentration and temperature as to render the potentially adhesive fibres tacky. For example, fibres of organic cellulose derivatives, such as cellulose esters, may be rendered adhesive by solvents, such as acetone, ethyl acetate, butyl acetate, and the like.

3. When the fibres are tacky at the time of activation, they can be activated by pressure alone.

4. A latent activating agent may be combined with the potentially adhesive fibres and/or with the non-adhesive fibres. Such agent may be rendered active by a subsequent treatment, such as chemical agents, heat or irradiation, thus producing a simultaneous activation of the potentially adhesive fibres. For example, fibres may be impregnated with a liquid which, at room temperature, is a non-solvent therefor but which, at a higher or lower temperature is a solvent sufficiently active to render the potentially adhesive fibres adhesive.

A plasticizer may be applied to the fibres and/or to the product before activation. The plasticizer may function to increase the flexibility of the fibres and, when employed with thermoplastic fibres, the plasticizer may serve, in addition, to lower the thermal softening point. The plasticized thermoplastic fibres can be rendered adhesive by heating to a temperature below that at which the non-thermoplastic textile fibres associated therewith would be detrimentally affected by such heating. The plasticizer may be allowed to remain in the product, or it may be removed by suitable means, such as washing and extraction, thus again elevating the thermal softening point of the thermoplastic material and preventing reactivation upon ironing.

While the fibres are in an adhesive condition, the fibres are preferably subjected to a compacting treatment to promote adhesion of the associated fibres at their points of contact and the term "compacting" includes pressing, squeezing and tension. For example, mechanically applied pressure may be exerted on the activated material during and/or after activation, and/or during calendering, embossing, printing, drying and other operations involving the use of rollers.

After activation, the fibrous material is treated to deactivate the adhesive, that is, to render the adhesive non-tacky so as to fix the new relationship of the fibres. The nature and extent of the deactivation treatment will depend, inter alia, upon the nature and extent of the activating treatment and upon the proportion and kind of potentially adhesive fibres used. If activation has been accomplished by heat, deactivation may be accomplished by heating to a higher temperature as with thermo-setting resins, or by cooling; and if activation is by means of a solvent, deactivation may involve extraction of the solvent as by washing, evaporation, decomposition; if activation has been accomplished by pressing, deactivation follows upon release of the pressure. The removal of the activating agent depends upon whether its presence in the product is desirable or objectionable.

The activating, compacting and deactivating treatments herein described may be carried out independently of, or simultaneously with, various treatments common to the fabrication and finishing of textiles and felts or the laminating and sealing of sheet materials.

The properties of the finished product depend upon various factors, such as the nature and proportion of potentially adhesive fibres; the extent of the activation thereof; and the adhesive condition of the fibres during compacting; and the nature of the deactivation. The extent of activation, compacting and deactivation may be varied considerably, depending upon the relative proportions of the types of fibres, the properties of the potentially adhesive fibre and the effect desired in the product. The potentially adhesive fibres may be rendered superficially tacky; or made adhesive without losing their fibrous form; or rendered sufficiently fluid to spread under pressure to form a film in which the other fibres are embedded. If the potentially adhesive fibres are rendered only slightly tacky, the frictional resistance between fibres will be increased and the strength improved. If the potentially adhesive fibres are rendered substantially adhesive, they will cohere to each other and adhere to the other fibres to fix the position thereof to give a product having increased tensile strength and lower stretch and shrinkage, and if a film is formed the product may be given a glassy smooth surface.

By way of illustration, but not by way of limitation of the invention, there will be given the following specific examples of various products and fields of use of the invention:

*Example I*

Figure 3:
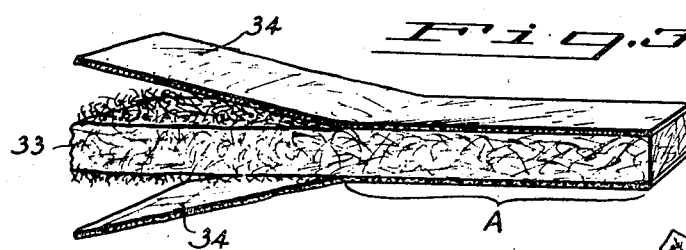
Figs. 3, 4, 5, 6 and 7 are perspective views of as many embodiments of the laminated article of the invention.

The process of the invention is adapted for making various types of flat felts, per se, or for surfacing felts made of other fibres for the purpose of laying the nap fibres, preventing the loss of fibres and otherwise decorating or strengthening such felts. For example, there is shown in Fig. 3 a layer of wool felt 33 which has a substantial nap. To impart a smooth surface to this felt, there may be applied to one or both sides of the layer 33, a mat of fibres 34 consisting of potentially adhesive fibres. Upon activation of the adhesive fibres with pressure, the mat of fibres 34 will be caused to unite to the surface of the layer 33 of wool felt, thus laying the nap fibres and providing a smooth surface to the wool felt, as shown in the area designated A in the article shown in Fig. 3. If the fibres of the mat of fibres 34 have a color contrasting with that of the fibres in the felt 33, an interesting decorative effect will be produced. The product designated A in Fig. 3 may be considered a laminated product, the outer layer comprising a mat of potentially adhesive fibres, the fibres of which are bound to each other and to the surface of the layer 33.

*Example II*

Figure 4:
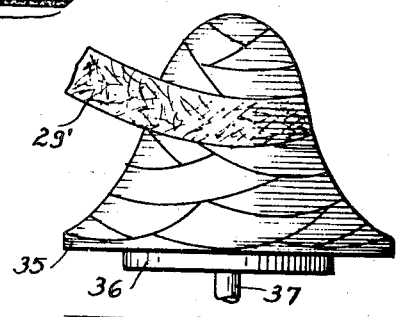

The mat of potentially adhesive fibres produced according to the present invention may also be used in the manufacture of molded felt bodies, in particular, hat felts. For example, there is shown in Fig. 4 one embodiment of a process of making a hat body using the mat of fibres of the invention. The strip 29' is wound in overlapping relation on a hat body 35 which is mounted upon a base 36 and rotated by means of a shaft 37. By rotating the mold, the mat of fibres may be applied to the surface of the mold 35 in overlapping layers, as illustrated, until a layer of requisite thickness is built up. At this point, by the application of heat and pressure to the surface of the felt layers, the layers may be caused to adhere to each other. In place of making the entire hat structure of superposed strips of the mat of potentially adhesive fibres, a hat body of conventional construction may be wrapped therewith to provide a distinctive surface. If desired, the hat body thus formed may be removed from the mold 35 and molded into a suitable hat shape by means of heat and pressure, using suitable molds for that purpose as known in the art. If desired, the activation of the potentially adhesive fibres may be delayed until the felt body is molded in its final shape, the activation at this time serving to retain the shape of the article better than when the activation is carried out prior to shaping. If the mat of fibres 29 is very thin, it is possible that in the final molding, the lines defining the overlapping areas, will substantially disappear so that no surface finishing of the hat body will be necessary. On the other hand, in the preferred embodiment the hat body before or after molding into a hat shape is finished by brushing to raise a sufficient nap, or the surface is given a suede finish by spraying a layer of short fibres thereon by conventional means. The suede finish may be anchored to the hat body by suitable adhesives, such as rubber latex or solutions of resins.

It is to be understood that in addition to hat bodies, other objects may be molded from the mat of fibres, either by shaping a thick mat of fibres into the desired form or by covering the form by winding as illustrated in Fig. 4. For example, short sections of pipe may be covered with a layer of insulating material by winding the mat of fibres 29' about the pipe until the layer of requisite thickness has been built up, and activating the potentially adhesive fibres. This insulation will, of course, be a continuous sleeve, free from longitudinal seams or cracks now present in conventional pipe insulation.

*Example III*

Figure 5:
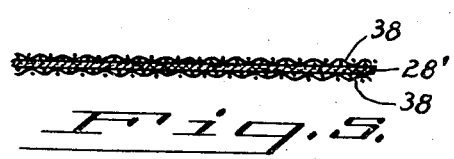

The mat of fibres of the invention has numerous applications in the laminating art. For example, referring to Fig. 5, a mat of potentially adhesive fibres 28' may be disposed between layers of sheet materials, such as layers of fabric 38 and the layers united by activating the potentially adhesive fibres in the mat 28' while subjecting the article to pressure. It is to be understood that the mat of fibres 28' may be treated to activate the fibres prior to the assembling of the layers and/or after the assembling of the layers. Instead of layers of textile, the laminated product may comprise layers of felt, paper, wood, metal foil or films of non-fibrous materials, such as cellophane, cellulose derivatives or synthetic resins, and the layers may be the same or different. The composite article may be subjected to sufficient solvent and/or heat and pressure to activate the potentially adhesive fibres, i. e., sufficient to bind the fibres to each other in the mat of fibres 28', as well as to unite the layers to each other. Where the outer layers of the laminated product are transparent, interesting decorative effects are obtained by employing mats of fibres 28' which comprise colored fibres which contrast with the color of the transparent layers.

This embodiment of the invention has particular application in the manufacture of starchless collars in which the plies of the collar are united to each other by the mat of fibres 28', thus obtaining a porous flexible product which is susceptible to repeated laundering without loss of quality. Since the mat of fibres 28' can be extremely thin if produced according to the present invention, the laminated product produced will be highly porous. The cost of laminating with a fibrous web, according to the present invention, is extremely economical, since the amount of solid material employed per unit of area may be less than when a continuous film of the same material is employed or when a layer of a thermoplastic fabric is employed as heretofore suggested in the art.

*Example IV*

Figure 6:
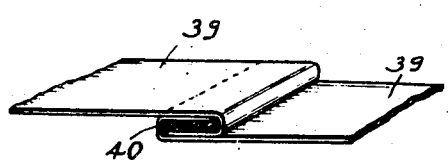

There is shown in Fig. 6 one embodiment of a seam which may be produced by using the mat of fibres of the present invention. The seam is formed by interfolding the layers 39 and disposing between the folds comprising the seam a strip 40 comprising a mat of potentially adhesive fibres. If the fibres in the mat 40 are thermoplastic, the seam may be permanently sealed by running a hot iron over the seam, or by running the seam through a heated calender. By use of this simple method of forming seams, stitching may be completely eliminated, although the present invention does not preclude the stitching of the seam before or after activating the fibres in the mat 40. It is to be understood that the layers 39 may be formed of textile fabric, felt, leather, paper and foils of all kinds.

*Example V*

Figure 7:
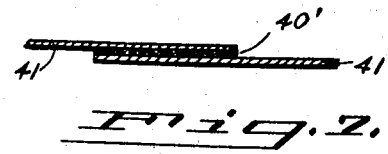

The mat of fibres of the present invention has numerous applications in the sealing art. For example, there is shown in Fig. 7 the section through a wrapper or carton lid in which the overlapping layers 41 of the wrapping material are sealed together by interposing between the overlapping contiguous surfaces a layer 40' comprising a mat of potentially adhesive fibres. The activation of the fibres in the mat 40' effectively seals the overlapping portions of the layers 41.

In the foregoing examples, an interfelted web or mat consisting in whole of potentially adhesive fibres is employed, but it is to be understood that, if desired, an interfelted web or mat consisting of a major proportion of potentially adhesive fibres and a minor proportion of non-adhesive fibres may be employed so long as the amount of non-adhesive fibres present is not sufficient to preclude a good bonding surface.

By the present invention there has been provided a novel mat of fibres comprising potentially adhesive fibres, which after activation of the fibres shows a relatively high tensile strength and increased resistance to tearing and abrasion. By forming such mats of fibres in accordance with the spraying process herein described, the fibres of the mat may have smaller dimensions than those obtainable by the use of rayon spinnerettes. The fibres made by this method vary in length and diameter. Accordingly, more points of contact are produced upon activation of the sprayed fibres than are produced from an equal weight of potentially adhesive fibres formed with such spinnerettes.

Further, the products of the invention may at any time be embossed, calendered, molded or otherwise shaped, in whole or in part, to deform the surface while the adhesive fibres are still tacky and then subsequently deactivated to set them with a desired form or surface condition to produce effects such as grain, lustre, smoothness or designs, by suitable means, used hot or cold and with or without the aid of agents which soften, swell, plasticize the material acted on.

The fibrous products may be colored before, during or after activation, compaction and/or deactivation, by dyeing, printing, for example, with inks containing pigments or dyestuffs which are resistant to such treatments. If desired, the activating agent or the deactivating agent may be added to the dyebath or the printing ink.

Thus, a greater effect is obtainable with an equal weight of fibres or the same effect can be obtained with a lesser weight of potentially adhesive fibres. By forming the fibres by the spraying or equivalent methods described herein, the present invention enables one to employ cheaper fibre-forming materials and also materials not physically adapted for forming filaments by rayon spinning methods and permits the incorporation in the fibre-forming composition of a wider variety of additional ingredients, in particular, a wider variety of plasticizers, and permits the use of inherently tacky fibres and fibres which become inactivatable with time, and which, by reason of such characteristics, could not be formed, shipped or manipulated in conventional textile or felting operations. Since the potentially adhesive material is in fibrous form, there is no loss of material during the fabrication of the fibrous structures as would be the case if such adhesive material were employed in the form of particles or powder.

Since certain changes in carrying out the above process, and certain modifications in the article which embody the invention may be made without departing from its scope, it is intended that all matter contained in the above description or shown in the accompanying drawings shall be interpreted as illustrative and not in a limiting sense.

I claim:

1. The method of spinning an unwoven fabric comprising: heating a plastic spinning material to a molten state; disrupting the molten material into a gaseous atmosphere into a plurality of filaments; and depositing the said filaments while sufficiently plastic to adhere to one another, upon a retaining wall in such a manner as to cause the filaments to intersect and unite into an integral pervious web.

2. A method of making articles of the character described comprising: reducing a spinning material to a fluid condition; disrupting the said fluid material into a gaseous atmosphere into a plurality of filaments; and depositing the said filaments in an adhesive and intersecting condition upon a retaining wall moving in an endless path to build up a succession of integral fabric windings in which each successive winding is deposited in a sufficiently adhesive condition to adhere to its adjacent winding.

3. The method of making articles of the character described comprising: disrupting a fluid plastic into a gaseous atmosphere into a plurality of filaments; depositing the said filaments upon a foraminous retaining wall moving in an endless path to build up a succession of webs of intersecting filaments having interstices thereamong; bonding the said filaments of each of the said webs at the said intersections; and passing a fluid stream through the said interstices and retaining wall during the said bonding.

4. The method of spinning an unwoven fabric comprising: disrupting a plastic spinning material into a gaseous atmosphere into a plurality of filaments; and depositing the said filaments while they are still sufficiently plastic to adhere to one another upon a retaining wall in such a manner as to cause the filaments to intersect and unite into an integral pervious web.

5. The method of spinning an unwoven fabric comprising: forming a plastic spinning solution of a fibre producing material and a solvent; disrupting the said solution into a gaseous atmosphere into a plurality of filaments; and depositing the said filaments while sufficiently plastic to adhere to one another upon a retaining wall in such a manner as to cause the filaments to intersect promiscuously and unite into an integral pervious web.

CARLETON S. FRANCIS, Jr.

REFERENCES CITED

The following references are of record in the file of this patent:

UNITED STATES PATENTS

| Number | Name | Date |
|---|---|---|
| 1,606,307 | Loomis | Nov. 9, 1926 |
| 1,949,214 | Mason | Feb. 27, 1934 |
| 2,011,914 | Schwartz | Aug. 20, 1935 |
| 2,048,651 | Norton | July 21, 1936 |
| 2,116,942 | Formhals | May 10, 1938 |
| 2,202,025 | Reed | May 28, 1940 |
| 2,219,346 | Thomas | Oct. 29, 1940 |
| 2,277,049 | Reed | Mar. 24, 1942 |
| 2,336,743 | Manning | Dec. 14, 1943 |
| 2,336,745 | Manning | Dec. 14, 1943 |
| 2,381,061 | Kallmann | Aug. 7, 1945 |